United States Patent
Chen et al.

(10) Patent No.: US 7,711,037 B2
(45) Date of Patent: May 4, 2010

(54) FRACTIONAL CHIP CORRELATION DEVICE AND METHOD FOR OPERATING FRACTIONAL CHIP CORRELATION IN SPREAD SPECTRUM RECEIVER

(75) Inventors: Chun-nan Chen, Taipei (TW); Jui-Ming Wei, Taichung (TW)

(73) Assignee: MEDIATEK Inc., Hsin-Chu (TW)

( * ) Notice: Subject to any disclaimer, the term of this patent is extended or adjusted under 35 U.S.C. 154(b) by 733 days.

(21) Appl. No.: 11/615,271

(22) Filed: Dec. 22, 2006

(65) Prior Publication Data
US 2008/0151970 A1  Jun. 26, 2008

(51) Int. Cl.
*H04B 1/00* (2006.01)
(52) U.S. Cl. .................................... 375/150
(58) Field of Classification Search .............. 375/142, 375/147, 150
See application file for complete search history.

(56) References Cited

U.S. PATENT DOCUMENTS

| 5,901,171 | A | 5/1999 | Kohli et al. |
| 6,289,041 | B1* | 9/2001 | Krasner ................. 375/152 |
| 6,788,735 | B2 | 9/2004 | Kohli et al. |
| 7,061,967 | B2* | 6/2006 | Schelm et al. ........... 375/147 |

* cited by examiner

*Primary Examiner*—Don N Vo

(57) ABSTRACT

A fraction chip correlation device for a spread spectrum receiver for receiving signals modulated with spread spectrum codes and a method for operating fractional chip correlation to spread spectrum signals received by the spread spectrum receiver are disclosed. In the present invention, at least one delayed version of an input signal is generated to be correlated with a local code replica to accomplish fractional chip correlation. By doing so, correlators can operate at a low speed, so that power consumption of the receiver can be significantly reduced.

17 Claims, 6 Drawing Sheets

US 7,711,037 B2

FRACTIONAL CHIP CORRELATION DEVICE AND METHOD FOR OPERATING FRACTIONAL CHIP CORRELATION IN SPREAD SPECTRUM RECEIVER

TECHNICAL FIELD OF THE INVENTION

The present invention relates to spread spectrum signal receiver, more particularly, to fractional chip correlation in the spread spectrum signal receiver.

BACKGROUND OF THE INVENTION

In a spread spectrum communication system, an input data stream of a received signal is modulated with a series of spreading code. For example, in GPS (Global Positioning System) system, C/A code is used to modulate signals. In a receiver receiving a spread spectrum signal, it is necessary to generate a local code replica and correlate the local code replica with the received signal, so as to de-spread the signal.

To acquire and track satellites with sufficient efficiency, resolution and accuracy, fractional chip correlation is utilized. In fractional chip correlation, delayed version(s) of the local code replica are correlated with the received signal to synchronize the local code with the code received by the satellite by determining which of the delayed version(s) and the original version is the one which correlates with the received code the most accurately. In practice, the delayed chip space used in the fractional chip correlation should be ½ chip at most in acquisition mode. In tracking mode, the fractional chip space should be less, ¼ or even ⅛, for example, so as to provide sufficient accuracy, since one chip indicates a range of 300 meters in positioning.

FIG. 1 is a block diagram showing a conventional fractional chip correlation device of a receiver, in which the chip space is ¼ chip. FIG. 2 is a diagram showing the waveform at respective components of the fractional chip correlation device in FIG. 1. To perform the fractional correlation for chip space of ¼ chip, the correlator must operate at a speed that is 4 multiples of the sampling rate fs. A signal received by the receiver is down-converted and digitized into an IF (intermediate frequency) signal, which is sampled at a high sampling rate fs, for example, fs=8 fc (fc is the chipping rate of the spread spectrum system). Then the IF signal is latched by a latch 11. The signal is down-sampling by an integration unit 12. The sampling rate fs of down-sampled signal is reduced to 4 fc. As can be seen in FIG. 2, the samples of the down-sampled signal are not as dense as the input signal. The down-sampled signal is then transmitted to four correlators 140, 142, 144 and 146 to be correlated with a local code replica generated by a local code replica generator 16 and delayed versions of the local code replica delayed by delay units 202, 204 and 206, respectively. Specifically, the correlator 140 correlates the signal with the local code replica without delay; the correlator 142 correlates the signal with the local code replica delayed with ¼ chip from the delay unit 202; the correlator 144 correlates the signal with the local code replica delayed with ½ chip; the correlator 146 correlates the signal with the local code replica delayed with ¾ chip. The waveforms of the various versions of the local code replica are shown in FIG. 2.

In the above example, in order to keep up with the fractional chip code transition, the correlation is executed at a high sampling rate, which is 4 fc is this case. The high operation speed results in heavy power consumption, which is a critical problem to a CDMA receiver.

SUMMARY OF THE INVENTION

The present invention is to provide a fraction chip correlation device for a spread spectrum receiver for receiving signals modulated with spread spectrum codes. The present invention also provides a method for operating fractional chip correlation to spread spectrum signals received by the spread spectrum receiver. By using the fractional chip correlation in accordance with the present invention, power consumption of the receiver can be significantly reduced.

In accordance with the present invention, the fractional chip correlation device comprises a first latch receiving an input signal and outputting the input signal and at least one delayed version of the input signal; a plurality of integration units respectively integrating the input signal and at least one delayed version of the input signal to down-sample the signals; a plurality of second latches respectively connecting to the integration units for aligning the down-sampled signals; and a plurality of correlators respectively connected to the second latches for correlating the signals with a local code replica The first latch outputs said at least one delayed version of the input signal with a delay based on a required chipping space or a multiple of the chipping space. In addition, in addition to correlate the signals with the local code replica, the correlators can also correlate the signals with a delayed version of the local code replica.

In accordance with the present invention, the method for operating fractional chip correlation to spread spectrum signals, said method comprising receiving a signal; latching the signal to output the signal and at least one delayed version thereof; integrating the signal and said at least one delayed version thereof to down-sample the signals; latching the down-sampled signals to align the signals with each other; and correlating the down-sampled signals with a local code replica, respectively. The delayed version of the input signal is delayed with a delay based on a required chipping space or a multiple of the chipping space. In addition to correlating the input signal and said at least one delayed version thereof with the local code replica, the method may also includes correlating the signals with a delayed version of the local code replica.

DETAILED DESCRIPTION OF THE INVENTION

The present invention will be described in detail in conjunction with the appending drawings.

Figure 1:
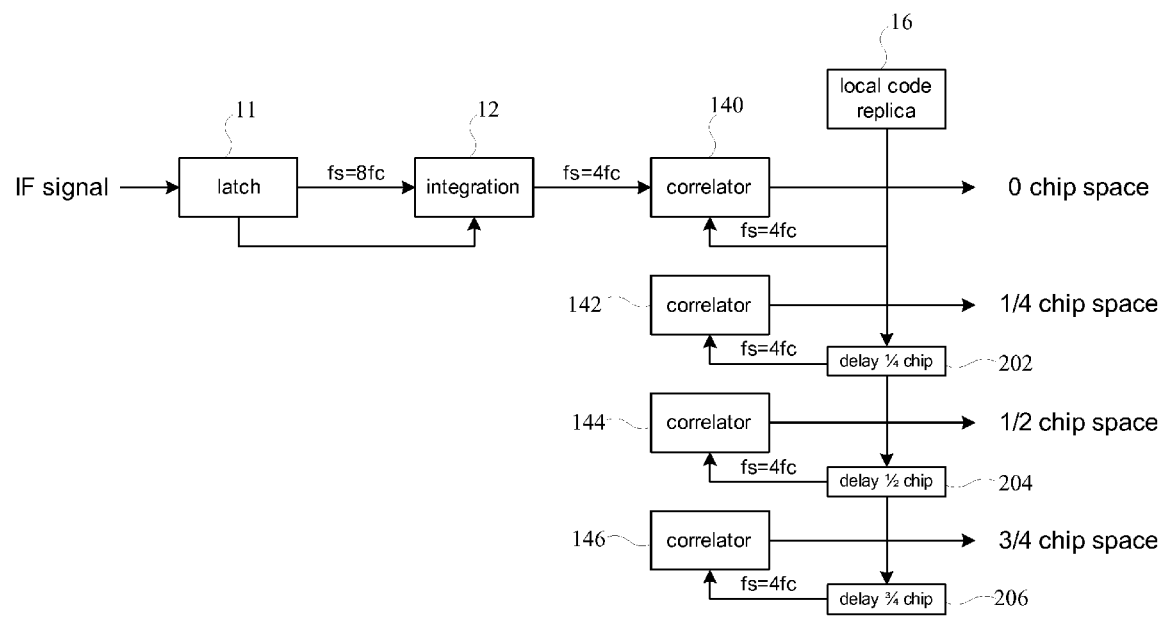
FIG. 1 is a block diagram showing a fractional chip correlation device of a receiver of prior art.
Figure 2:
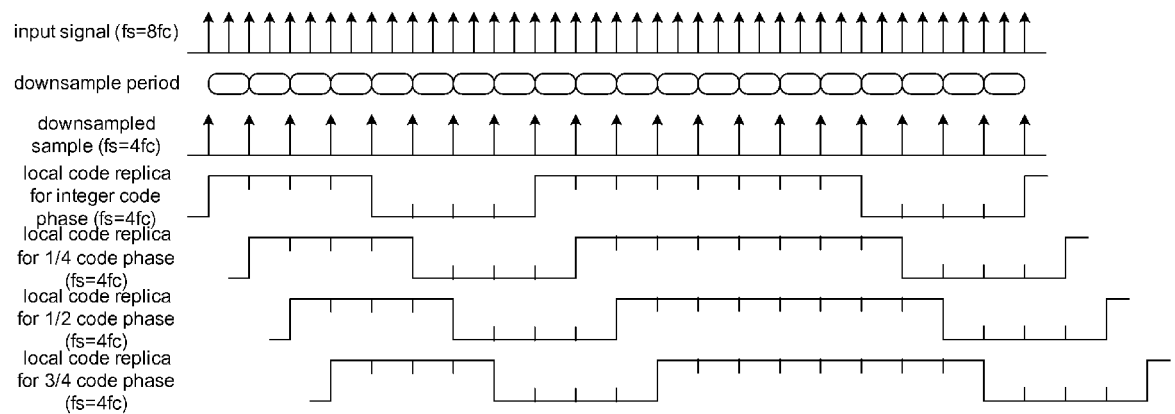
FIG. 2 is a diagram illustrating waveforms at the respective components of the fractional correlation device in FIG. 1.
Figure 3:
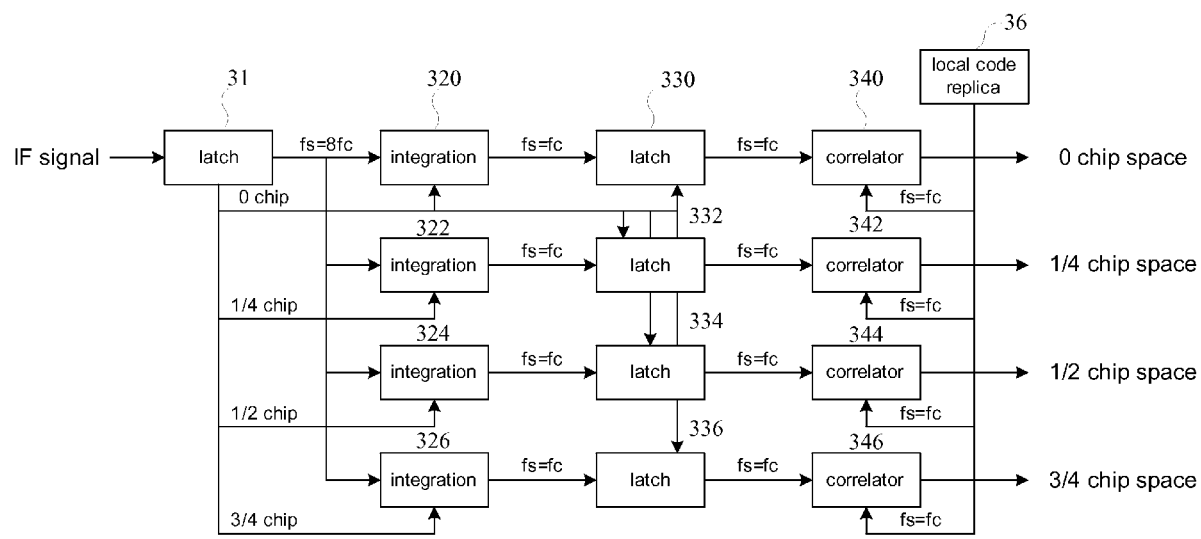
FIG. 3 is a block diagram showing a fractional chip correlation device of a receiver in accordance with an embodiment of the present invention.
Figure 4:
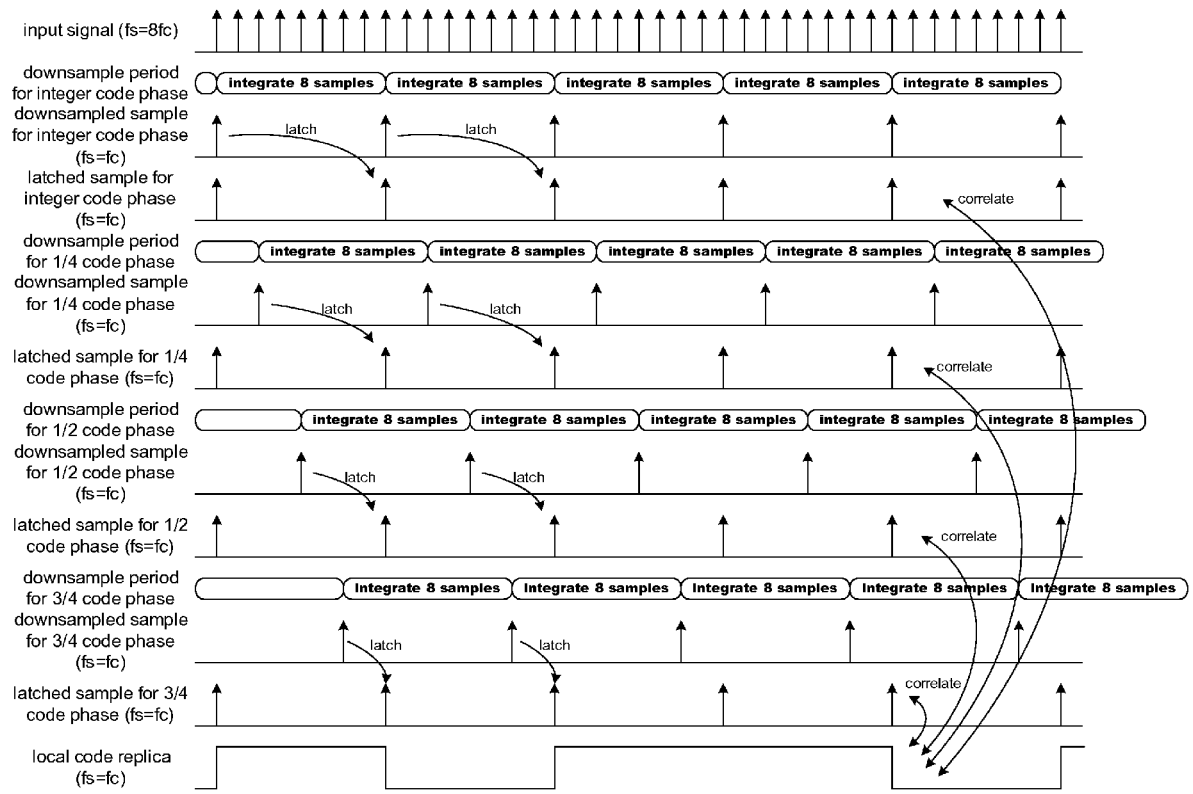
FIG. 4 is a diagram illustrating waveforms at the respective components of the fractional chip correlation device in FIG. 3.

FIG. 3 is a block diagram showing a fractional chip correlation device of a receiver in accordance with an embodiment of the present invention. In the fractional chip correlation device of the receiver (e.g. a CDMA receiver such as a GPS receiver) in accordance with the present embodiment of the present invention, an IF signal down converted from an input signal received by the receiver is passed to a latch 31 so that the signal is transmitted to the successive components at a proper timing. The input signal with a sampling rate of fs=8 fc, for example, is sent to four integration units 320, 322, 324, and 326. The integration unit 320 integrates to down-sample the signal without any delay. The integration units 322, 324 and 326 integrate the incoming samples to down-sample the signal with different delays. In the present embodiment, the integration unit 322 integrates to down-sample the signal with a delay of ¼ chip. The integration unit 324 integrates to down-sample the signal with a delay of ½ chip. The integration unit 326 integrates to down-sample the signal with a delay of ¾ chip. The various delays are controlled by the latch 31. The waveforms of the down-sampled signals can be seen in FIG. 4. The fractional correlation device further has four latches 330, 332, 334, 336 connected with the integration units 320, 322, 324, and 326, respectively, to align the down-sampled samples of the respective signals with different delays. The waveforms thereof can be seen in FIG. 4. Then, the latched down-sampled signals with different delays are respectively correlated by correlators 340, 342, 344, and 346 with a local code replica generated by a local code replica generator 36. By using this architecture, the correlators 340, 342, 344, and 346 operate at a speed of a sampling rate fs=fc. In comparison to the prior art described above, the correlators in the fractional correlation device in accordance with the present invention operate at a very low speed. That is, calculation load for the correlators in the fractional correlation device in accordance with the present invention is not so heavy. Accordingly, the power consumption can be controlled to a low degree.

Figure 5:
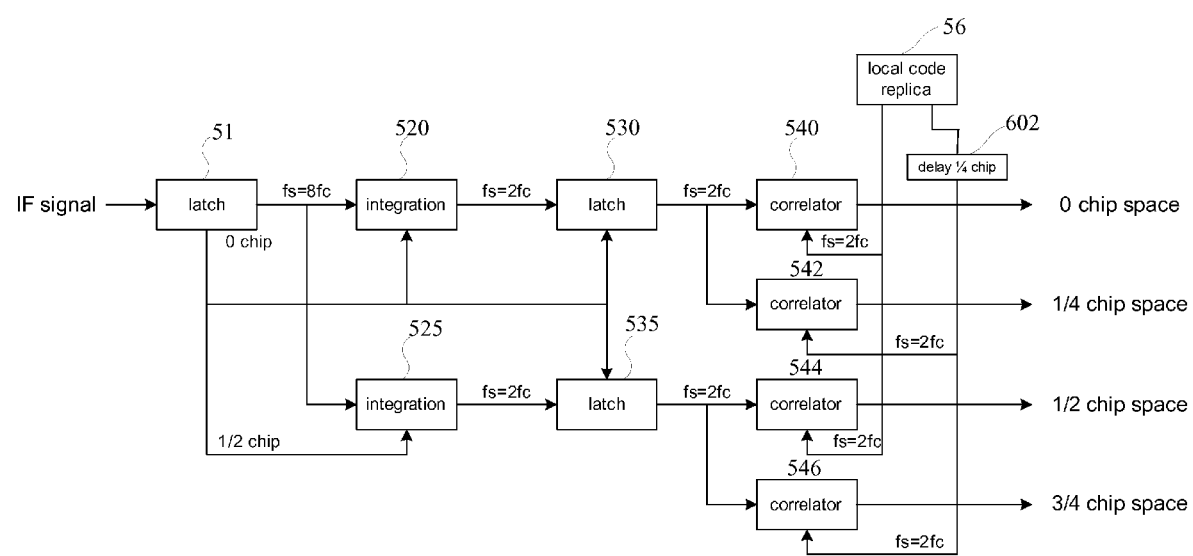
FIG. 5 is a block diagram showing a fractional chip correlation device of a receiver in accordance with another embodiment of the present invention.
Figure 6:
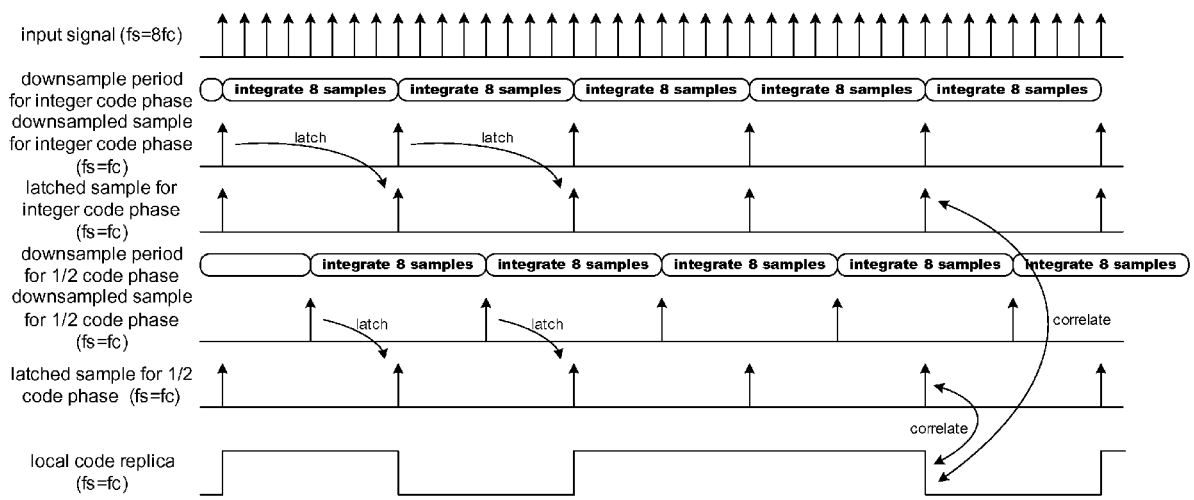
FIG. 6 is a diagram illustrating waveforms at the respective components of the fractional chip correlation device in FIG. 5.

FIG. 5 is a block diagram showing a fractional chip correlation device of a receiver in accordance with another embodiment of the present invention. In addition, FIG. 6 is a diagram illustrating waveforms at the respective components of the fractional chip correlation device in FIG. 5. In the first embodiment, the input signal is delayed into various delayed versions, while the local code replica maintains as the same. In the present embodiment, the input signal and the local code replica are both delayed. The correlation device of the present embodiment has a latch 51 to ensure incoming IF signal down-converted from a signal received by the receiver is transmitted to the successive components at a proper timing. The incoming IF signal has a sampling rate of fs=8 fc, for example. Then, the signal is dump-sampled by integration units 520 and 525 without delay and with ½ chip delay, respectively. The delay is controlled by the latch 51. The corresponding waveforms thereof can be seen in FIG. 6. The down-sampled signals without and with ½ chip delay are passed to latches 530 and 535, respectively, so as to be aligned with each other as shown in FIG. 6. The signal from the latch 530 is transmitted to correlators 540 and 542 to be correlated with a local code replica generated by a local code replica generator 56 and a delayed version thereof, respectively. The delayed version of the local code replica is generated by using a delay unit 602 for delaying the local code replica with ¼ chip. On the other hand, the signal from the latch 535 is transmitted to correlators 544 and 546 to be correlated with a local code replica and a delayed version thereof, respectively. As mentioned above, the delayed version of the local code replica is delayed by the delay unit 602 with ¼ chip. The corresponding waveforms can be seen in FIG. 6. In the present embodiment, after the signal of the high sampling rate fs 8 fc is down-sampled by the integration units 520 and 525, the operation sampling rate for the following components will be lowered to 2 fc. Accordingly, the four correlators 540, 542, 544 and 546 also operate at a speed of the sampling rate fs=2 fc, which is not so high as compared to the prior art. The power consumption can be significantly reduced.

In accordance with the present invention, the IF signal down-converted from the input signal received by the receiver is delayed with different delays (e.g. ¼ chip, ½ chip, ¾ chip) to generate at least one delayed version of the signal. Then the signal and the delayed version(s) thereof are down-sampled to lower the sampling rate. The down-sampled signals are latched by respective latches to be aligned with each other. Then the aligned signals are correlated with a local code replica by the respective correlators. Alternatively, the aligned signals are respectively correlated with a local code replica and at least one delayed version thereof by the respective correlators. The delayed version of the local code replica is delayed by the delay unit with ¼ chip, for example. It is noted that the chipping space such as ¼ chip or ½ chip described in the above embodiments are described as examples rather than limitations to the present invention.

By using at least one delayed version of the incoming signal and correlating the incoming signal per se and the delayed version(s) thereof with the local code replica, alternatively, with the local code replica and at least one delayed version thereof, the operation speed of the correlators of the fractional correlation device can be significantly lowered. That is, the calculation load for each correlator is decreased as compared to the prior art. Therefore, the power consumption can be reduced, which is very desirable to the spread spectrum receiver such as a CDMA receiver, for example.

While the preferred embodiments of the present invention have been illustrated and described in detail, various modifications and alterations can be made by persons skilled in this art. The embodiment of the present invention is therefore described in an illustrative but not restrictive sense, It is intended that the present invention should not be limited to the particular forms as illustrated, and that all modifications and alterations which maintain the spirit and realm of the present invention are within the scope as defined in the appended claims.

What is claimed is:

1. A fractional chip correlation device for a spread spectrum receiver for receiving signals modulated with spread spectrum codes, said device comprising:
   a first latch receiving an input signal and outputting the input signal and at least one delayed version of the input signal;
   a plurality of integration units respectively integrating the input signal and at least one delayed version of the input signal to down-sample the signals;
   a plurality of second latches respectively connecting to the integration units for aligning the down-sampled signals; and
   a plurality of correlators respectively connected to the second latches for correlating the signals with a local code replica.

2. The device of claim 1, wherein the first latch outputs said at least one delayed version of the input signal with a delay based on a required chipping space.

3. The device of claim 2, wherein the first latch outputs the input signal and a plurality of delayed versions of the input signal, said delayed versions are gradually delayed by an increment determined based on the required chipping space, the number of the delayed versions is also determined based on the required chipping space.

4. The device of claim 3, wherein the numbers of the integration units, second latches and correlators are corresponding to sum of the input signal and the delayed versions.

5. The device of claim 3, wherein the numbers of the integration units and second latches are corresponding to sum of the input signal and the delayed versions, and the number of the correlators is corresponding to the sum of the input signal and the delayed version thereof multiplied by the multiple.

6. The device of claim 1, wherein the first latch outputs said at least one delayed version of the input signal with a delay based on a multiple of a required chipping space, and a first group of the correlators correlate the input signal and said at least one delayed version thereof with the local code replica and a second group of the correlators correlate the input signal and said at least one delayed version thereof with a delayed version of the local code replica.

7. The device of claim 6, wherein the delayed version of the local code replica is delayed based on the required chipping space.

8. The device of claim 7, further comprising a delay unit for delaying the local code replica and outputting the delayed version of the local code replica.

9. The device of claim 6, wherein the first latch outputs the input signal and a plurality of delayed versions of the input signal, said delayed versions are gradually delayed by an increment determined based on the multiple of the required chipping space, the number of the delayed versions is also determined based on the multiple of the required chipping space.

10. The device of claim 1, further comprising a local code replica generator for generator the local code replica.

11. A method for operating fractional chip correlation to spread spectrum signals, said method comprising steps of:
receiving a signal;
latching the signal to output the signal and at least one delayed version thereof;
integrating the signal and said at least one delayed version thereof to down-sample the signals;
latching the down-sampled signals to align the signals with each other; and
correlating the down-sampled signals with a local code replica, respectively.

12. The method of claim 11, wherein said at least one delayed version of the input signal is delayed with a delay based on a required chipping space.

13. The method of claim 12, wherein a plurality of delayed versions of the input signal are output, said delayed versions are gradually delayed by an increment determined based on the required chipping space, the number of the delayed versions is also determined based on the required chipping space.

14. The method of claim 11, wherein said at least one delayed version of the input signal is delayed with a delay based on a multiple of a required chipping space.

15. The method of claim 14, further comprising correlating the input signal and said at least one delayed version thereof with a delayed version of the local code replica.

16. The method of claim 15, wherein the delayed version of the local code replica is delayed based on the required chipping space.

17. The method of claim 14, wherein a plurality of delayed versions of the input signal are output, said delayed versions are gradually delayed by an increment determined based on the multiple of the required chipping space, the number of the delayed versions is also determined based on the multiple of the required chipping space.

* * * * *